United States Patent
Darnell et al.

(10) Patent No.: US 6,862,728 B2
(45) Date of Patent: Mar. 1, 2005

(54) HASH TABLE DISPATCH MECHANISM FOR INTERFACE METHODS

(75) Inventors: Stephen Darnell, Maidenhead (GB);
William Thomas Charnell, Great Missenden (GB); Wayne Plummer, High Wycombe (GB); Blaise Abel Alec Dias, Middx (GB); Philippa Joy Guthrie, Aylesbury (GB); Jeremy Paul Kramskoy, Long Kitton (GB); Jeremy James Sexton, Hemel Hempstead (GB); Michael John Wynn, Maidenhead (GB); Keith Rautenback, High Wycombe (GB); Stephen Paul Thomas, High Wycombe (GB)

(73) Assignee: Esmertec AG, Dubendorf (CH)

( * ) Notice: Subject to any disclaimer, the term of this patent is extended or adjusted under 35 U.S.C. 154(b) by 473 days.

(21) Appl. No.: 09/859,133

(22) Filed: May 16, 2001

(65) Prior Publication Data

US 2002/0108107 A1 Aug. 8, 2002

Related U.S. Application Data

(63) Continuation of application No. PCT/GB99/00788, filed on Mar. 16, 1999.

(30) Foreign Application Priority Data

Nov. 16, 1998 (GB) .............................................. 9825102

(51) Int. Cl.[7] .................................................. G06F 9/45
(52) U.S. Cl. ...................... 717/148; 717/151; 717/158; 717/162; 717/165; 717/166; 719/328; 719/331; 719/332
(58) Field of Search ................................ 717/139, 140, 717/148, 158, 151, 162, 165, 167, 166, 153, 765, 136, 138; 719/328, 332, 331, 330; 707/11; 365/733; 712/204, 214

(56) References Cited

U.S. PATENT DOCUMENTS 4,525,780 A * 6/1985 Bratt et al. .................. 711/163
4,675,829 A   6/1987 Clemenson (List continued on next page.)

OTHER PUBLICATIONS

TITLE: A Multithread Environment for Parallel Computation, author: Kalas et al, ACM, Oct., 1994.*
TITLE:VCODE: A Retargetable, Extensible, Very Fast Dynamic Code Generation System, author: Engler, ACM, 1996.*

(List continued on next page.)

*Primary Examiner*—Chameli C. Das
(74) *Attorney, Agent, or Firm*—Caesar, Rivise, Bernstein, Cohen & Pokotilow, Ltd.

(57) ABSTRACT

A hash table dispatch mechanism for interface Methods. The mechanism reduces dispatch times during the execution of an object-oriented language program. An interface hash table having a pointer as an index for either a specific location in a corresponding dispatch table or an interface Method of the program is created for a dispatch table. The interface hash table has an address and a plurality of slots having a hash value related to an interface Method. The mechanism includes a recovery Method for resolving conflicts when two or more slots in the interface hash table contain clashing values.

38 Claims, 3 Drawing Sheets

U.S. PATENT DOCUMENTS

| | | | |
|---|---|---|---|
| 4,924,408 A | | 5/1990 | Highland |
| 5,210,876 A | | 5/1993 | Uchida |
| 5,301,260 A | | 4/1994 | Miyashita |
| 5,301,325 A | | 4/1994 | Benson |
| 5,339,436 A | | 8/1994 | Tairaku et al. |
| 5,367,685 A | | 11/1994 | Gosling |
| 5,442,792 A | | 8/1995 | Chun |
| 5,450,575 A | | 9/1995 | Sites |
| 5,452,457 A | | 9/1995 | Alpert et al. |
| 5,469,574 A | | 11/1995 | Chang et al. |
| 5,511,190 A | * | 4/1996 | Sharma et al. ................. 707/1 |
| 5,530,964 A | | 6/1996 | Alpert et al. |
| 5,551,040 A | | 8/1996 | Blewett |
| 5,590,332 A | | 12/1996 | Baker |
| 5,598,561 A | | 1/1997 | Funaki |
| 5,603,030 A | | 2/1997 | Gray et al. |
| 5,613,120 A | | 3/1997 | Palay et al. |
| 5,655,122 A | | 8/1997 | Wu |
| 5,675,804 A | | 10/1997 | Sidik et al. |
| 5,721,854 A | | 2/1998 | Ebcioglu et al. |
| 5,761,513 A | | 6/1998 | Yellin et al. |
| 5,764,989 A | | 6/1998 | Gustafsson et al. |
| 5,815,720 A | | 9/1998 | Buzbee |
| 5,835,771 A | | 11/1998 | Veldhuizen |
| 5,848,274 A | | 12/1998 | Hamby et al. |
| 5,857,104 A | | 1/1999 | Natarjan et al. |
| 5,872,978 A | | 2/1999 | Hoskins |
| 5,873,104 A | | 2/1999 | Tremblay et al. |
| 6,041,179 A | * | 3/2000 | Bacon et al. ................. 717/116 |
| 6,079,018 A | * | 6/2000 | Hardy et al. ................. 713/170 |
| 6,189,048 B1 | * | 2/2001 | Lim et al. ..................... 719/330 |
| 6,205,465 B1 | * | 3/2001 | Schoening et al. ......... 718/102 |
| 6,301,652 B1 | * | 10/2001 | Prosser et al. ............... 712/204 |
| 6,338,133 B1 | * | 1/2002 | Schroter ..................... 712/214 |
| 6,366,876 B1 | * | 4/2002 | Looney ....................... 703/25 |
| 6,412,105 B1 | * | 6/2002 | Maslennikov et al. ...... 717/151 |
| 6,513,156 B2 | * | 1/2003 | Bak et al. ................... 717/151 |
| 6,529,909 B1 | * | 3/2003 | Bowman-Amuah .......... 707/10 |
| 6,529,948 B1 | * | 3/2003 | Bowman-Amuah ......... 709/217 |
| 6,539,396 B1 | * | 3/2003 | Bowman-Amuah ..... 707/103 R |
| 6,615,253 B1 | * | 9/2003 | Bowman-Amuah ......... 709/219 |
| 6,651,248 B1 | * | 11/2003 | Alpern ....................... 717/162 |
| 6,664,978 B1 | * | 12/2003 | Kekic et al. ................ 345/733 |
| 6,704,927 B1 | * | 3/2004 | Bak et al. ................... 717/151 |

OTHER PUBLICATIONS

TITLE: Efficient instruction cache simulation and execution profiling with a threaded–code interpreter, author: Magnusson, ACM, Dec. 1997.*

TITLE: A Thread–Dispatching Kernel for Event–Driven Application, IEEE, author: Mohideen et al, 1990.*

TITLE: Simple and Effective Link–Time Optimization of Modula–3 Programs, author: Fernandez et al, ACM, 1995.*

TITLE: Virtual Memory on a Narrow Machine for an Object–Oriented Language, author: Kaehler, ACM, 1986.*

TITLE: Continuous Profiling: Where all the cycles gone? Author: Anderson et al, ACM, 1997.*

Java World—Di Giorgio—Jul. 1997—Use native methods to expand the Java enviroment.

Karaoman, M. et al.–jContractor: a reflective Java library to support design by contract–V 1616, Jul. 19–21, 1999, pp. 175–196,Saint–Malo, Fr.

Java Native Interface Specification—Java Native Interface Specification Release May 16, 1997, Sun Microsystems, Inc., California.

Dyadkin, L.J. –Multibox Parsers—ACM Sigplan Notices, Association for Computing Machinert, New York, Vol. 29, No. 7, Jul. 1, 1994, pg. 54–60.

* cited by examiner

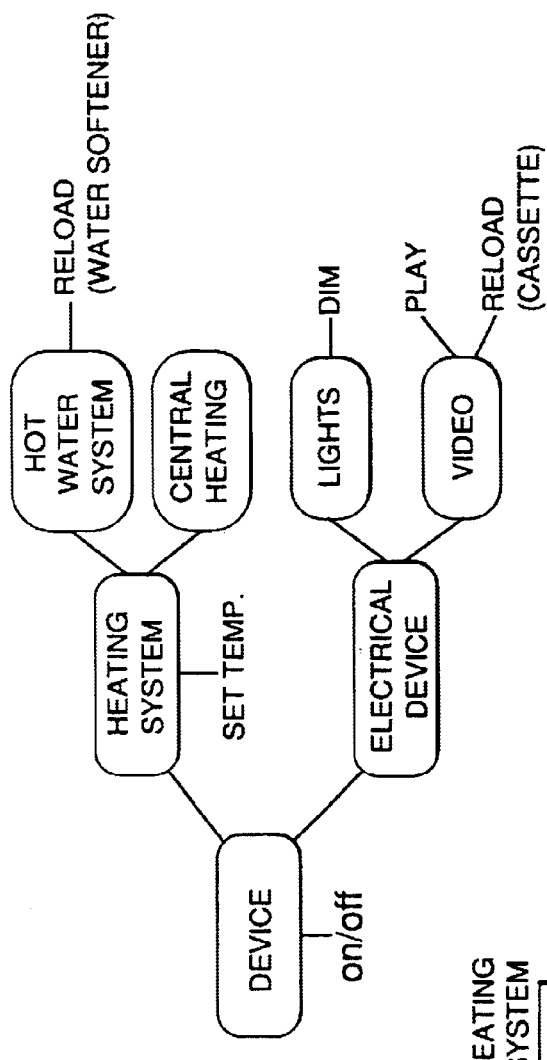
FIG. 1D
FIG. 1E
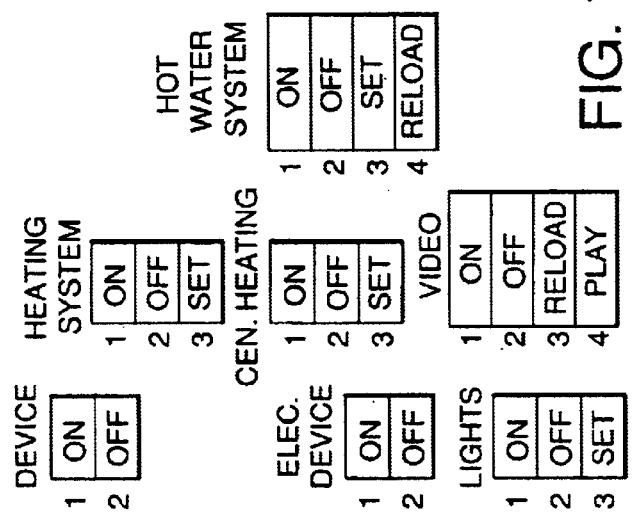
FIG. 1F

HASH TABLE DISPATCH MECHANISM FOR INTERFACE METHODS

CROSS-REFERENCE TO RELATED APPLICATIONS

This is a continuation of International Application PCT/GB99/00788, Filed on Mar. 16, 1999, which claims priority to U.K. Patent Application GB9825102.8, filed on Nov. 16, 1998, now abandoned and all of whose entire disclosures are incorporated by reference herein.

BACKGROUND OF THE INVENTION

1. Field of Invention

The invention preferably relates to optimized execution of object oriented languages which use the 'interface' abstraction, and in particular JAVA. In a preferred embodiment, the invention relates to Dispatch Mechanism for Interface Methods.

2. Description of Related Art

In recent years, there have been developments in programming languages towards what is known as an object-oriented language. In these developments, concepts are regarded as 'objects', each carrying with it a set of data, or attributes, pertinent to that object, as well as information relating to so-called 'methods', that is functions or subroutines, that can be performed on that object and its data. This is well known to those skilled in the art of computing and/or programming.

The advent and rapid advancement in the spread and availability of computers has led to the independent development of different types of systems, such as the IBM and IBM-compatible PC running IBM-DOS or MS-DOS or MS-Windows applications, the Apple Macintosh machines running their own Apple System operating system, or various Unix machines running their own Unix operating systems. This proliferation of independent systems has led to useful applications being available only in one format and not being capable of running on a machine for which the application was not designed.

Under such circumstances, programmers have devised software which 'emulates' the host computer's operating system so that a 'foreign' application can be made to run successfully in such a way that, as far as the user is concerned, the emulation is invisible. In other words, the user can perform all of the normal functions of say a Windows-based application on a Unix machine using a Unix-based operating system without noticing that he is doing so.

A particularly notable product of this type is that developed by Insignia Solutions of High Wycombe, GB and Santa Clara, Calif., USA and known under the name 'SoftWindows 2.0 for Powermac'. This software enables a physical Macintosh computer to emulate a PC having an Intel 80486DX processor and 80487 maths co-processor plus memory, two hard disks, IBM-style keyboard, colour display and other features normally found on recent versions of the PC-type of computer.

Furthermore, there is an ever-increasing demand by the consumer for electronics gadgetry, communications and control systems which, like computers, have developed independently of one another and have led to incompatibility between operating systems and protocols. For example, remote-control devices for video players, tape players and CD players have similar functions, analogous to 'play,' 'forward,' 'reverse,' 'pause,' etc., but the codes for transmission between the remote control, or commander, operated by the user may not be compatible either between different types of equipment made by the same manufacturer or between the same types of equipment made by different manufacturers. There would be clear benefits of having software within the equipment which can produce for example the correct 'play' code based upon a 'play' command regardless of the specific hardware used in the equipment. Such software is commonly known as a 'Virtual Machine.'

Other uses and applications are legion: for example, set-top boxes for decoding television transmissions, remote diagnostic equipment, in-car navigation systems and so-called 'Personal Digital Assistants.' Mobile telephones, for instance, can have a system upgrade downloaded to them from any service provider.

Emulation software packages lend to have certain features in common, notably that they are not general purpose but are dedicated. They are of most benefit in rapid development areas and have a distinct advantage in enabling manufacturers to cut costs. In particular, they can divorce software from the physical machine, i.e., the effect of the software in the physical machine can be altered by the emulating software without having to go into the machine's native software to implement those changes.

The specific object-oriented language used in some of the implementations described later is that known as JAVA (registered trade mark to Sun Microsystems Corporation). Some of the following implementations will enable JAVA to be used in smaller devices than is currently possible because of the improved performance and/or reduced memory footprint. Future uses projected for embedded software (virtual machines) include computers worn on the body, office equipment, household appliances, and intelligent houses and cars.

While it is recognised that there are clear advantages in the use of virtual machines, especially those using object-oriented languages, there are naturally areas where it is important and/or beneficial for some of the operations that are carried out within the system to be optimised. These may include reducing the memory requirement, increasing the speed of operation, and improving the 'transparency' of the system when embedded in another system. One of the principal aims of the inventions described herein is to provide a Virtual Machine which is optimised to work as quickly as possible within a memory constraint of, for example, less than 10, 5, 2 or even 1 Mbyte. Such a constraint is likely to be applicable, for example, to electronics gadgetry and other equipment where cost (or size) is a major constraint.

JAVA supports single inheritance of class types, with interfaces. Interfaces themselves can be multiply inherited from other interfaces. When a concrete class claims to implement a set of interfaces, it must provide or inherit implementations of every method directly or indirectly defined by those interfaces. (See Reference [2] listed under Other Information at the end of this specification).

In object oriented programming, objects are classified in a hierarchical stricture with each object associated with attributes (data about its features or properties) and methods (functions it may perform). Typical such functions might be 'ring' in the context of a mobile or other telephone, or 'play' in the context of audio and/or video reproduction equipment. As one of the features in object-oriented languages, such as JAVA, the attributes and methods of a super class of objects are 'inherited' by its subclasses.

For example, as shown in FIG. 1A, "mode of transportation" 400 is the superclass of both 'bike' 402 and 'car' 404 classes of objects. The 'car' sub-class could be subdivided into 'saloon' 406 and 'sports' 408 and further subdivision is possible according to, for example, the make or model of sports car etc. Certain attributes of the 'car' sub-class, such as the number of wheels, model, and so on, will be inherited by the 'saloon' and 'sports' sub-classes. In a similar vein, methods such as 'turn on lights' can be common to cars within the hierarchy, but in some sub-classes the methods themselves may differ to the extent that a certain function has to be performed before lights can actually be turned on. For instance, a sports car with pop-up headlights may need to raise the lights before they can be turned on. In such a case, the inheritance has to be overridden by the need to perform a function before the function in question can be performed.

In another context, the user of a mobile or other telephone may wish to arrange for his handset to emit a different ring depending on whether the call was business or social. In this context, 'ring' would be termed an 'interface.' Its significance is that 'ring' is a function that a variety of objects in the hierarchy would perform (like 'turn on lights' in the car example above) but the actual implementation would differ from object to object. Interfaces therefore cut across hierarchies. An interface is thus a list of functions that the object can perform (such as 'ring' or 'play' or 'record' and so on).

Single inheritance is usually implemented using dispatch tables (otherwise known as virtual function tables). A subclass inherits the dispatch table of its superclass, extending it with any new methods, and replacing entries which have been overridden.

Multiple inheritance in languages such as C++ is normally implemented using multiple dispatch tables and offsets ((See Reference [1] listed under Other Information at the end of this specification).

The relevant data is stored in slots in a dispatch table illustrated schematically in FIG. 1B. The attributes of an object in a table 410 are always located at the same distance from the start of the object. The object includes a pointer 412 to a dispatch table of methods 414 which are always at the same distance from the start for the same function. However, when interface methods are used, as explained above, there is no longer any certainty of knowing in which slot of the dispatch table the particular function appears. This is a problem peculiar to the multiple inheritance and particularly interfaces found in JAVA language.

Up to now, the whole of the dispatch table had to be interrogated to check that the method accessed was the proper method. It had been realised that, ideally, a unique identifier would be needed for the interfaces, but in practice the table cannot be of such a size that everything within it has a unique identifier.

Reverting to the 'play' function analogy, there would be one dispatch table for video recorder and one for tape recorder. Each would have different interface references, so 'play' might be at position 2 for video recorder and position 22 for tape recorder.

The logical definition of invoking an interface method is to search the list of methods implemented directly or indirectly by the given class of object. This is clearly slow. This can be improved by searching a 'flat' structure which mirrors the dispatch table.

Reference [3] listed under Other Information at the end of this specification describes an optimization where the last offset at which the interface method was found is remembered, and tried as a first guess next time the invoke interface is encountered. If the guess turns out to be wrong, a fuller search is performed. This approach is based on the assumption that a given call site will tend to operate on the same type of objects.

Even if the guess is right, the destination method has to be checked to confirm that it is. In the cases where the guess is wrong, a fairly slow search is needed.

Another approach would be to use an analog of the way C++ multiple inheritance is supported.

BRIEF SUMMARY OF THE INVENTION

The invention solves this problem by a method for reducing dispatch times during the execution of a program in object-oriented language, which program has a number of interface methods, the method including the steps of:

(i) creating dispatch tables;

(ii) creating an interface hash table for one or more of the dispatch tables, the interface hash table having a pointer either as an index into a specific location in the corresponding dispatch table, or to a method stored on a computer executing the program;

(iii) when the program executes a step requiring a particular interface method, using the interface hash table to look up the latter interface method, either via the dispatch table, or directly.

Whereas the latter method applies in the case where the invention is applied to the program, the invention can also be applied in the form of a "virtual machine" wherein software emulates a "virtual" computer system in order to run a "foreign application. However, steps (ii) and (iii) above are still similarly applied.

More particularly, the invention also provides a method for reducing dispatch times wherein a virtual machine, and a set of programs executed by the virtual machine are stored on a computer readable medium (such as a CD); the virtual machine being operative to reduce dispatch times in the course of program execution by:

(i) creating dispatch tables;

(ii) creating an interface hash table for one or more of the dispatch tables, the interface hash table having a pointer either as an index into a specific location in the corresponding dispatch table, or to a method stored on a computer executing the program;

(iii) when the program executes a step requiring a particular interface method, using the interface hash table to look up the latter interface method, either via the dispatch table, or directly.

These methods of reducing dispatch time can clearly be specifically applied to JAVA.

In one embodiment of the invention, there is one interface hash per dispatch table. In another embodiment of the invention, there is a single interface hash table for all the dispatch tables.

In one form of the invention, the dispatch table points to the interface hash table. In another form of the invention, the hash table is part of the dispatch table at the start. This later form of the invention thereby eliminates one level of indirection.

The interface hash table can contain, for example, slot numbers of the dispatch table. Alternatively, the interface hash table can contain function points, thereby eliminating one level of indirection.

Chief advantages of at least preferred embodiments of the invention are that it is fast in the majority of situations. It uses no support routines in the common case, and does not need checks on the caller. This makes the common case fast, and makes the generated code smaller. It also has very little memory overhead, since a small hash table is needed only in the case where a class implements an interface. Small and fast are important qualities for uses such as Mobile Telephones where memory is limited on account of size or cost.

The method of the invention preferably includes the step of calling a special recovery method, in the event of a collision occurring when looking up the same interface method in the interface hash table. In this case, the hash table can either point to a method stored in the computer, or to a fallback slot in the dispatch table, which will redirect the call to an appropriate stored method, which is designed to "sort out" the class and direct the call to the appropriate location.

According to the invention in its broadest aspect, the solution to this problem is to use an extra level of indirection through a hash table.

For the majority of cases where there is no clash in the hash table, invoking an interface is only slightly slower than a standard virtual dispatch, and faster than the known techniques for invoking interface methods. It is also expected to be more compact than the C++ multiple inheritance approach, especially when dispatch table slots contain more than one word of information.

Where there is a clash in the interface hash table, a fallback slot in the dispatch table performs the slow but sure search.

According to other aspects of the invention, the problem of fast access to the required information is solved or alleviated by the use of an interface hash table as well as a dispatch table for each of the various devices.

The following considerations apply to any and all of the inventions and aspects of the inventions described above.

BRIEF DESCRIPTION OF THE SEVERAL VIEWS OF THE DRAWINGS

Preferred embodiments of the invention will now be described, purely by way of example having reference to the accompanying figures of the drawings (which represent schematically the improvements) in which:

FIG. 1D is a hierarchical structure of a domestic equipment system;

FIG. 1E shows dispatch tables used in operating devices in the domestic system of FIG. 1D; and FIG. 1F shows a controller program with driver devices for operating the devices in the domestic system of FIG. 1D.

DETAILED DESCRIPTION OF THE INVENTION

Figure 1:
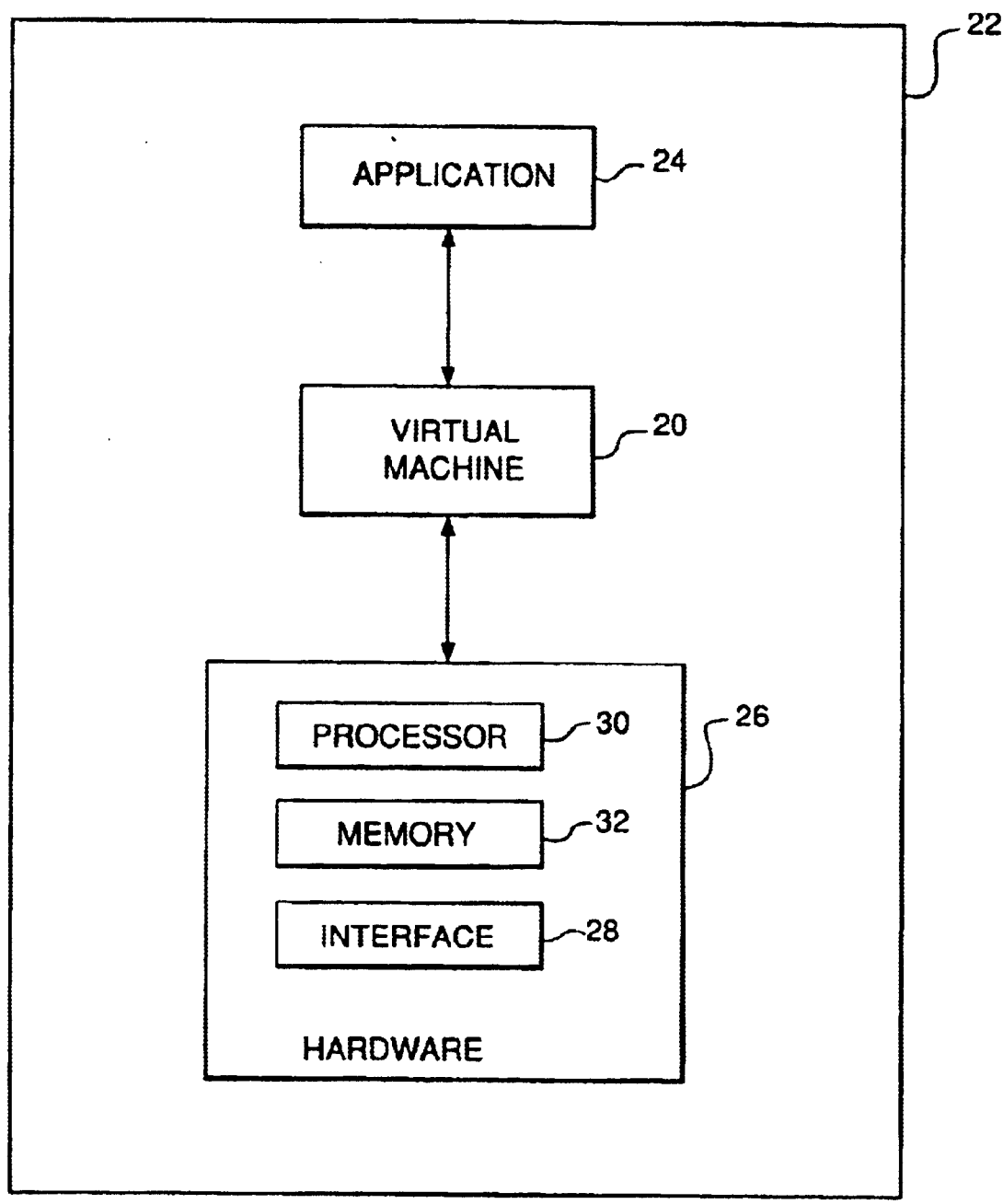
FIG. 1 shows certain components of the virtual machine.
Figure 1A:
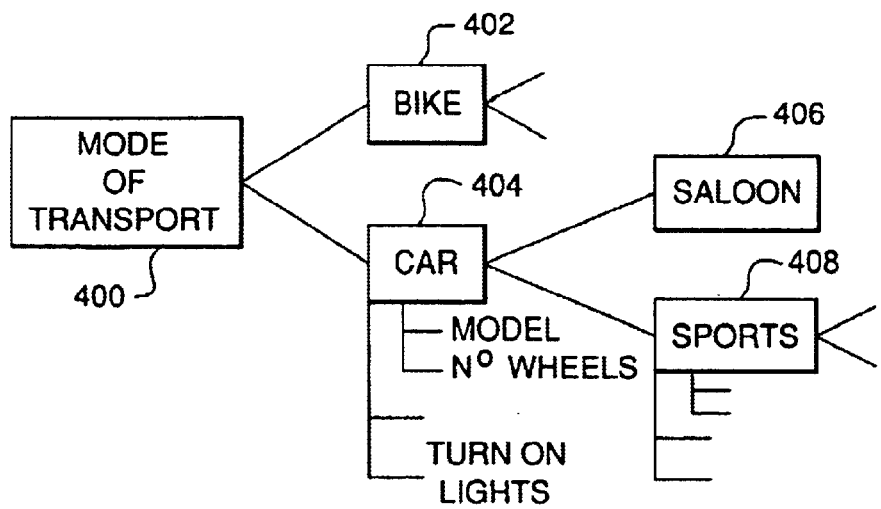
FIG. 1A illustrates a hierarchical structure in object-oriented programming.
Figure 1B:
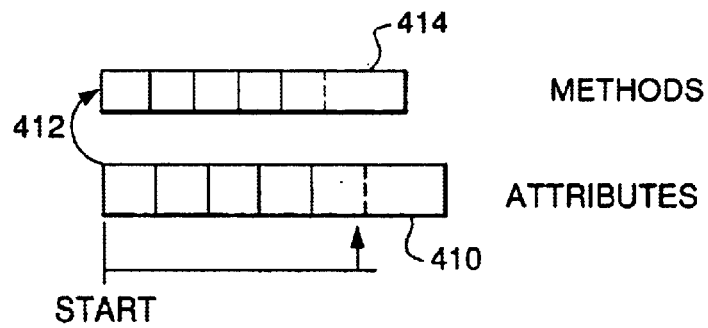
FIG. 1B shows the arrangement of data stored in dispatch tables.

A specific example of a preferred embodiment of virtual machine is now described with reference to FIG. 1.

The virtual machine 20 is an executable code installed in the particular item of equipment 22. It can provide a degree of independence from the hardware and operating system. The virtual machine may typically include any, some, or all of the following features: an operating engine, a library of routines, one or more interpreters, one or more compilers, storage means for storing a plurality of instruction sequences, queue management means, and buffer management means.

The virtual machine is coupled to one or more applications 24 on one side (the "high level" side), and, on the other side (the "low level" side), perhaps via various intermediate logical units, to the hardware 26 of the item of equipment. The hardware can be regarded as including various ports or interfaces 28 (perhaps an interface for accepting user input); the virtual machine receives events from those ports or interfaces. The hardware also includes one or more processors/control means 30 and memory 32.

An embodiment of the invention will now be described by way of example only, to illustrate how a "virtual machine" can be applied in practice. It will be appreciated that this is just an illustrative example, because the "virtual machine" can be applied to very many different systems. Examples of these include Mobile Telephones (which incorporate hand-held computers); Set Top Boxes for digital television; Video Equipment which is intended for use with MPEG digital systems; and intelligent Disc Drives. The invention is particularly useful where, due to physical size (e.g., Mobile Telephones) memory is limited and more efficient modes of executing programs, using an object-oriented language such as JAVA, can be used. The memory onboard a Mobile Telephone may be limited, for example, to less than 500 kB, and it is in environments with limited memory that the invention works well. However, it can also run well for memories above this.

FIGS. 1D–1F schematically illustrate an example of employing a virtual machine to a domestic environment where a computer (not shown), or microcontroller (not shown), is equipped with a controller program 460 for controlling the state of operating devices 461–464 used in controlling the supply or flow of WATER (e.g. valves); HEAT (e.g. timers, valves, pumps); and LIGHTS (e.g. switches); and also controlling the operation of a VIDEO system (e.g. switches). These operating devices 461–464 are each shown connected to respective device drivers 465–468 which receive appropriate command signals from the Controller Program 460 during execution of a program, so that appropriate drives are given to the switches, valves, pumps, etc. to produce the required action. Input 469 enables the Controller Program to be tailored to the user's requirements whereby, for example, at preset times, the heating system is turned on and off (and its temperature is adjusted), the video system is caused to play; and so on.

Referring now to FIG. 1D, there is shown various parts of a domestic system represented as objects that are classified in a hierarchical structure where DEVICE is a class having the method of on and off that is common to the sub-classes HEATING SYSTEM and ELECTRICAL DEVICE and the subsequent sub-classes HOT WATER SYSTEM (or the domestic hot water used for washing); CENTRAL HEATING (which is a closed circulation system used in space heating); LIGHTS (which include the lights in each room); and VIDEO (which includes the control functions for playing, recording, ejecting cassettes, etc.). In addition, the HEATING SYSTEM has the method of Set Temperature, which enables control, of room temperature; the HOT WATER SYSTEM has the method Reload (which is intended to indicate when a water softener cartridge needs to be changed; the LIGHTS sub-class has the method Dim; and the VIDEO sub-class has the attributes Play and Reload cassette.

FIG. 1E shows the Dispatch Tables for this class and its sub-classes. In all Dispatch Tables, ON and OFF functions occupy positions 1 and 2. However, position 3 for the HOT WATER SYSTEM and the CENTRAL HEATING SYSTEM is Set Temperature, whereas the same position 3 is Dim for lights and Reload for WATER and VIDEO. The method Reload will need to distinguish between reloading a cartridge in the water softener and reloading a cassette in the Video system, but the Reload attribute is otherwise similar. Only a few control functions have been illustrated in FIG. 1E to simplify the drawings and description, and their dispatch tables will normally contain many more slots or entries.

It is clear from FIGS. 1D–1F that an interface exists, between the class/sub-classes (or control functions, i.e. methods) where the same method is used in controlling a similar function in the operating devices. One interface, is the ON/OFF method; another interface is RELOAD method. Each interface method is allocated a small hash value. This interface hash value can be derived in many ways, but must not exceed the size of the hash table. Preferably, the hash values are chosen to reduce as far as possible conflicts between interface methods. One way of doing this is to derive pseudo-random hash values from each interface methods name, or some other fairly random attribute of the interface method.

Preferably, choose a starting hash value which does not collide with any related interface classes, and then allocate hash numbers for each member method of the interface sequentially from this. Hash values should be chosen so that methods of the same interface or related interfaces have unique hash values and do not conflict or clash. Clearly an object which implements many interfaces or interfaces with many methods may not be able to avoid clashes. A larger hash table usually reduces the number of clashes.

Figure 1C:
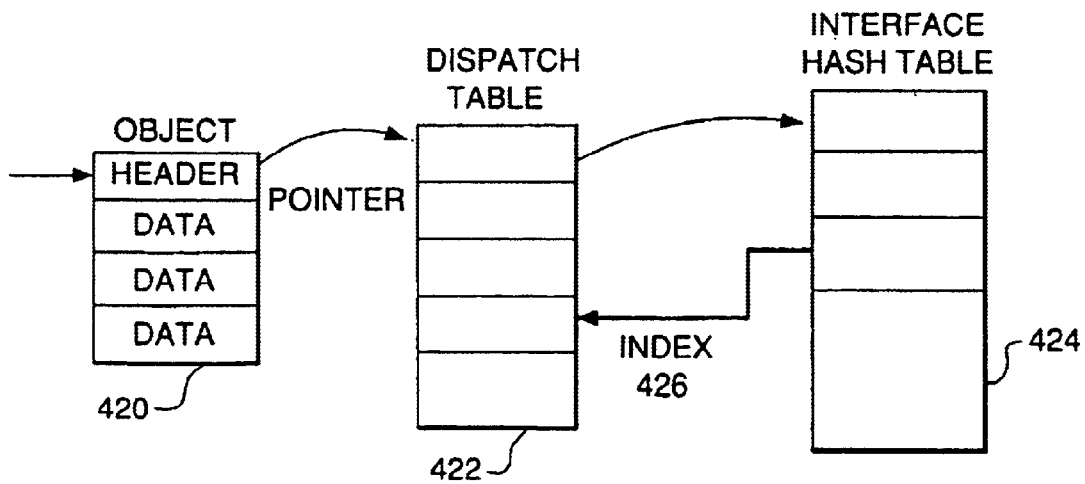
FIG. 1C shows the application of an interface hash table to a dispatch table.

FIG. 1C illustrates an embodiment of the invention wherein the data for an object (e.g. Video) within a particular hierarchy (e.g. FIG. 1D) is located in a data structure such as a table 420. The data structure will contain a header and a plurality of object data fields. When a call is made for a relevant method stored in slots in dispatch table 422, because of the uncertainty in knowing the exact slot in which that method is located, the dispatch table 422 will automatically re-route the call to a hash table 424 containing a condensed version of the method locations in the dispatch table 422. Also, because the locations within the hash table 424 are always the same for each method, the hash table will be able to generate an index pointer 426 leading to the correct location in the dispatch table 422 more quickly than searching all possible locations within the dispatch table. The same process is followed with other hash tables (not shown) and their respective dispatch tables.

In the event of a clash in the hash table, because the same location is needed for two interface methods, the hash table will point to a method stored in the computer designed to 'sort out' the clash and direct the caller to the appropriate location. This can also be done by first pointing to a slot (e.g., the first) in the dispatch table 422 which then points to the "sort out" method stored in the computer.

More generally speaking, each dispatch table is created after defining each concrete class and when the set of methods it implements is known. (The dispatch table will take into account method implementations inherited from its superclass). A fixed size hash table is created for each class which maps the interface method hash value described above to a dispatch table index of the corresponding implementation. Where a class implements two or more interface methods which have the same interface hash value, the hash table is set to contain the dispatch table index of the fallback routine for "sorting out" a clash.

This hash table is either included at the beginning of the dispatch table, or referenced from the dispatch table.

To invoke an interface method on a given object (in a register),
a. Load the address of the interface hash table for the given object.
b. Get the slot number for the specified interface method using its hash as an index into the interface hash table.
c. Load a unique identifier for the destination interface method into a register.
d. Given the dispatch table slot number, perform a normal virtual invoke.

The pseudo assembler sequence for the above steps is:

| Interface hash table pointed to by dispatch table | | |
|---|---|---|
| LOAD | Rd, doffs [Ro] | Load dispatch table address |
| LOAD | Ri, ioffs [Rd] | Load interface hash address |
| LOAD | Ri, hash [Ri] | Load slot from hash table |
| LOAD | Ru, #uniqIfaceId | Load unique interface id |
| LOAD | Ri, [Rd + Ri] | Get method address |
| CALL | Ri | Invoke interface method |

In the form of the invention where the hash table is part of the dispatch table, one level of indirection is eliminated.

| Interface hash table stored with (before) dispatch table | | |
|---|---|---|
| LOAD | Rd, doffs [Ro] | Load dispatch table address |
| LOAD | Ri, -hash [Ri] | Load slot from hash table |
| LOAD | Ru, #uniqIfaceId | Load unique interface id |
| LOAD | Ri, [Rd + Ri] | Get method address |
| CALL | Ri | Invoke interface method |

In the form of the invention where the interface hash table contains method pointers, another level of indirection is eliminated:

| Method address stored in interface hash table (plus previous optimisation) | | |
|---|---|---|
| LOAD | Rd, doffs [Ro] | Load dispatch table address |
| LOAD | Ri, -hash [Rd] | Load address from hash table |
| LOAD | Ru, #uniqIfaceId | Load unique interface id |
| CALL | Ri | Invoke interface method |

Where there is a clash between interface method hash entries for a particular class, the interface hash table contains the dispatch table index of a fallback method. The fallback method has access (in registers) to the destination object, and a unique identifier for the interface method. It performs the standard search for that object's implementation of the interface method.

It will be known to those of skill in the computing art that a hash table is a means of reducing lo manageable proportions a data set where information is sparsely populated and there is otherwise a high degree of redundancy within the data set. A hash table thus can reduce the scale of a whole application and thereby reduce the footprint of the device, one of the important features of JAVA.

In summary, the inventions of this patent application include
1. Using a Hash for Interface Methods Each interface method is allocated a small hash value. This interface hash value can be derived in many ways, but must not exceed the size of the hash table used below.

It is best if the hash values are chosen to reduce conflicts between interface methods, therefore hash values should be chosen so that methods of the same interface or related interfaces have unique hash values. Clearly an object which implements many interfaces or interfaces with many methods may not be able to avoid clashes.

Naturally, a larger hash table usually reduces the number of clashes.

2. Indirect Through a Hash Table when Invoking Interface Methods

When each concrete class is defined, the set of methods it implements is known, and a dispatch table is created. The dispatch table takes into account methods implementations inherited from its superclass.

A fixed size hash table is created for each class which maps the interface method hash value described above to a dispatch table index of the corresponding implementation. Where a class implements two or more interface methods which have the same interface hash value, the hash table is set to contain the dispatch table index of the fallback routine described below.

This hash table is either included at the beginning of the dispatch table, or referenced from the dispatch table.

To invoke an interface method on a given object (in a register), a. Load the address of the interface hash table for the given object.

b. Get the slot number for the specified interface method using its hash as an index into the interface hash table.

c. Load a unique identifier for the destination interface method into a register.

d. Given the dispatch table slot number, perform a normal virtual invoke.

3. Fallback Dispatch Table Entry

Where there is a clash between interface method hash entries for a particular class, the interface hash table contains the dispatch table index of a fallback method. The fallback method has access (in registers) to the destination object, and a unique identifier for the interface method.

It performs the standard search for that object's implementation of the interface method.

It will be known to those of skill in the computing an that a hash table is a means of reducing to manageable proportions a data set where information is sparsely populated and there is otherwise a high degree of redundancy within the data set. A hash table thus can reduce the scale of a whole application and thereby reduce the footprint of the device, one of the important features of JAVA. Overflows are taken into account in a way which is already known in the utilisation of hash tables.

Also according to the invention, therefore, a computer system includes one or more dispatch tables for storing data containing methods appropriate to objects in a class hierarchy and an interface hash table pointing to the location in the dispatch table where a method of interest is located.

The invention also provides a method of operating a computer system which uses dispatch tables containing methods appropriate to objects in a class hierarchy, including the steps of: directing a call for a method to the dispatch table; passing on the call to a hash table containing information as to the location of methods in the dispatch table; and redirecting the call from the hash table to that location in the dispatch table where the method is stored.

The invention also provides a computer system including means for storing data relating to an object, means for calling data relating to a method appropriate to the object, a dispatch table adapted to contain data relating to at least one the method, means for passing the call on to a hash table containing information as to the location of method(s) in the dispatch table and means for redirecting the call from the hash table to the dispatch table to access the location of the called method.

In one form of the invention, there is one interface hash per dispatch table. In another form of the invention, there is a single interface hash table for all the dispatch tables.

Alternatively, the invention provides both a method of improving the performance of interface dispatching by using a hash table and a computer system including a hash table to improve the performance of interface dispatching.

In another aspect, the invention provides a method or a computer system in which the interface reference for a particular method is found by means of a hash table.

It will be understood that 'interface dispatching' is the method by which the slot location for a particular method, e.g., the slot location number (2) for the 'play' function of a video recorder, is located and then the relevant data is called.

Chief advantages of the invention may include faster interface dispatching and/or a reduction in the size of footprint.

In each case, the method or computer system of the invention as specified in the preceding paragraphs may be applied specifically to JAVA.

The operation of the system can be looked at in another way. Thus, in FIG. 1C of the drawings, the data for an object within a particular hierarchy is located in a data structure such as a table 420. The data structure will contain a header and a plurality of frames containing relevant data. When a call is made for a relevant method stored in slots in a dispatch table 422, because of the uncertainty in knowing the exact slot in which that method is located, the dispatch table 422 will automatically re-route the call to a hash table 424 containing a condensed version of the method locations in the dispatch table. Also, because the locations within the hash table are always the same for each method, the hash table will be able to generate an index pointer 426 leading to the correct location in the dispatch table more quickly than searching all possible locations within the dispatch table.

In the event of a clash in the hash table, perhaps because the same location is needed for two interface methods, or perhaps due to being called by two different threads in a multi-threaded environment, the hash table will point to a method designed to 'sort out' the clash and direct the caller to the appropriate location or locations.

In any or all of the aforementioned, certain features of the present invention have been implemented using computer software. However, it will of course be clear to the skilled person that any of these features may be implemented using hardware or a combination of hardware and software. Furthermore, it will be readily understood that the functions performed by the hardware, the computer software, and such like are performed on or using electrical and like signals.

Features which relate to the storage of information may be implemented by suitable memory locations or stores. Features which relate to the processing of information may be implemented by a suitable processor or control means, either in software or in hardware or in a combination of the two.

In any or all of the aforementioned, the invention may be embodied in any, some or all of the following forms: it may be embodied in a method of operating a computer system; it may be embodied in the computer system itself; it may be embodied in a computer system when programmed with or adapted or arranged to execute the method of operating that system; and/or it may be embodied in a computer-readable storage medium having a program recorded thereon which is adapted to operate according to the method of operating the system.

As used herein throughout the term "computer system" may be interchanged for "computer", "system", "equipment", "apparatus", "machine" and like terms. The computer system may be or may include a virtual machine.

In any or all of the aforementioned, different features and aspects described above, including method and apparatus features and aspects, may be combined in any appropriate fashion.

It will be understood that the present invention(s) has been described above purely by way of example, and modifications of detail can be made within the scope of the invention.

Each feature disclosed in the description, and (where appropriate) the claims and drawings may be proved independently or in any appropriate combination.

Other Information

Related Patents:
U.S. Pat. No. 5,367,685
References:
[1] "The Annotated C++ Reference Manual" by M. Ellis and B. Stroustrup, Addison Wesley (ISBN 0-201-51459-1) pages 217–237
[2] "The JAVA Programming Language" by K. Arnold and J. Gosling, Addison Wesley (ISBN 0-201-63455-4) chapter 4
[3] "The JAVA Virtual Machine Specification" by T. Lindholm and F. Yellin, Addison Wesley (ISBN 0-201-63452-X) pages 258–260, 403–405
[4] "Modern Compiler Implementation in JAVA"; A. W. Appel; Chapter 14; published Mar. 12, 1998
JAVA is a trademark of Sun Microsystems.

What is claimed is:

1. A method of reducing the dispatch times of a virtual dispatch during the execution of an object-oriented language program in a system having a host machine and a virtual machine, the program having interface Methods and functions including individual functions and associated functions associated with the interface Methods, the method comprising:
    providing hierarchical relationships between functions represented by super class and sub class definitions of the functions, wherein super class functions have super class attributes, and sub class functions have inherited sub class attributes inherited from a corresponding super class function and non inherited class attributes not inherited from a super class function;
    creating a plurality of dispatch tables including interface Methods and individual functions having both inherited attributes and non inherited attributes;
    creating an interface hash table for a dispatch table, the interface hash table having a pointer as an index for a selected one of an interface Method or an individual function and recovery and search routines for recovering from a hash table collision and searching a list of functions;
    the dispatch table receiving and re-routing the call to the interface hash table during a call of a virtual dispatch requiring an interface Method or requiring an individual function;
    determining whether a collision has occurred in the hash table in response to the call and selectively executing the recovery routine or the fallback routine in response to the collision determination;
    the interface hash table selecting one of the interface Methods or one of the individual functions to provide a selected routine; and
    executing the selected routine in accordance with both the inherited attributes and the non inherited attributes.

2. A method as claimed in claim 1, further comprising determining whether two or more hash values in the interface hash table conflict.

3. A method as claimed in claim 2, further comprising calling a recovery Method when two or more hash values in the interface hash table conflict.

4. A method as claimed in claim 1, further comprising creating hash values that reduce the frequency of conflicts between two or more hash values in the interface hash table.

5. A method as claimed in claim 4, further comprising creating hash values for the interface hash table by deriving pseudo-random values based on the attributes of the interface Methods.

6. A method as claimed in claim 1, further comprising choosing a starting hash value and allocating other hash values sequentially from the starting hash value.

7. A method as claimed in claim 1, further comprising configuring the interface hash table to contain one of the group of a slot numbers of the dispatch table and function pointers.

8. A method as claimed in claim 1, further comprising defining each class of the program and a set of the interface Methods implemented by each class.

9. A method as claimed in claim 8, further comprising creating a fixed size interface hash table for each class, each fixed size interface hash table mapping an interface Method hash value to a dispatch table index.

10. A method as claimed in claim 1, in a system comprising:
    a compiler for compiling code of the program, the compiler arranged to compile a fragment of the code of the program;
    a compiler manager coupled to the compiler;
    an interpreter for interpreting the code of the program;
    the interpreter coupled to an execution history recorder;
    the execution history recorder arranged to record the number of times a fragment of code is executed, to record information regarding execution of fragments of code;
    and to alert the compiler manager when a fragment of code has been executed a threshold number of times.

11. A computer system as claimed in claim 10, wherein the interface hash table includes values derived from pseudo-random values based on attributes of the interface Methods.

12. A computer system as claimed in claim 10, wherein the interface hash table includes a starting hash value and a plurality of other hash values allocated sequentially from the starting hash value.

13. A computer system as claimed in claim 10, wherein the interface hash table includes one of the group consisting of a slot number of the dispatch table and function pointers.

14. A computer system as claimed in claim 10, wherein the execution history recorder is arranged to record a path of execution from a first fragment to a second fragment.

15. A computer system as claimed in claim 10, wherein the system is multi-threaded and the compiler runs on a thread separate from the thread executing the code.

16. A computer system as claimed in claim 10, further comprising a queue coupled to the compiler.

17. A computer system as claimed in claim 10, wherein the compiler, compiler manager and interpreter are part of the virtual machine.

18. A computer system as claimed in claim 10, further comprising a memory manager that monitors memory available to the compiler.

19. A computer system as claimed in claim 18, further comprising a deleter coupled to the memory manager.

20. A computer system as claimed in claim 18, wherein only dominant path or near dominant path fragments of code are compiled.

21. A method of reducing the dispatch times of a virtual dispatch during the execution of an object-oriented language program in a system having a host machine and a virtual machine, the program having interface Methods and functions including individual functions and associated functions associated with the interface Methods, the method comprising:

provide hierarchical relationships between functions represented by super class and sub class definitions of the functions, wherein super class functions have super class attributes, and sub class functions have inherited sub class attributes inherited from a corresponding super class function and non inherited class attributes not inherited from a super class function;

creating a plurality of dispatch tables including interface Methods and individual functions having both inherited attributes and non inherited attributes;

creating an interface hash table for a dispatch table, the interface hash table having a pointer as an index for a selected one of an interface Method or an individual function and recovery and search routines for recovering from a hash table collision and searching a list of functions, an address and a plurality of slots, each slot having a hash value related to one interface Method or one individual friction;

the dispatch table receiving and re-routing the call to the interface hash table during a call of a virtual dispatch requiring an interface Method or requiring an individual function;

determining whether a collision has occurred in the hash table in response to the call and selectively executing the recovery routine or the fallback routine in response to the collision determination;

loading the address of the interface hash table in a memory location;

retrieving a slot number for a particular interface Method or individual function using its respective hash value;

loading a unique identifier for a destination interface Method and individual function into a register; and performing a virtual invocation using its respective hash value in accordance with the inherited and non inherited attributes.

22. A method as claimed in claim 21, wherein the interface hash table is included in at least one of the plurality of dispatch tables.

23. A method as claimed in claim 21, wherein the interface hash table includes Method pointers.

24. A method as claimed in claim 21, comprising:
establishing an execution threshold;
executing a number of fragments of the program;
recording the number of times each of the fragments of the program is executed;
queuing one fragment of the program for compilation when the number of times the one fragment of the program has been executed matches the threshold; and
compiling the one fragment of the program.

25. A method as claimed in claim 24, further comprising adjusting the threshold after it is established.

26. A method as claimed in claim 24, further comprising monitoring memory available to the compiler.

27. A method as claimed in claim 24, further comprising deleting code from memory to meet the requirements of the compiler.

28. A method as claimed in claim 24, further comprising running the compiler on a thread that is separate from the thread of the interpreter.

29. A method as claimed in claim 24, further comprising recording a transfer of control into one fragment of code and a transfer out of the one fragment of code.

30. A method as claimed in claim 24, further comprising searching cache for preexisting compiled versions of fragments of code.

31. A method as claimed in claim 24, wherein the computer code includes at least one interface Method, and at least one of the fragments of code includes less than the entire at least one Method.

32. A method as claimed in claim 24, further comprising performing an exception check.

33. A method as claimed in claim 24, further comprising performing a code optimization.

34. A method as claimed in claim 24, further comprising interpreting exception code when an exception occurs.

35. A method as claimed in claim 24, further comprising establishing a link to a bailout device.

36. A method as claimed in claim 35, further comprising passing control to an interpreter.

37. A method as claimed in claim 24, further comprising updating condition states.

38. A method as claimed in claim 37, further comprising interpreting exception code after updating the condition states.

* * * * *